United States Patent
Muller et al.

(10) Patent No.: US 10,114,649 B2
(45) Date of Patent: Oct. 30, 2018

(54) THERMAL AVAILABILITY BASED INSTRUCTION ASSIGNMENT FOR EXECUTION

(71) Applicant: INTERNATIONAL BUSINESS MACHINES CORPORATION, Armonk, NY (US)

(72) Inventors: K. Paul Muller, Wappingers Falls, NY (US); David S. Wolpert, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 443 days.

(21) Appl. No.: 14/721,199

(22) Filed: May 26, 2015

(65) Prior Publication Data

US 2016/0350117 A1    Dec. 1, 2016

(51) Int. Cl.
*G06F 9/38*  (2018.01)
*G06F 9/50*  (2006.01)
*G06F 11/30* (2006.01)

(52) U.S. Cl.
CPC ......... *G06F 9/3836* (2013.01); *G06F 9/5094* (2013.01); *G06F 11/3024* (2013.01); *G06F 11/3058* (2013.01)

(58) Field of Classification Search
CPC .... G06F 11/00; G06F 9/3836; G06F 11/3058; G06F 9/5094; G06F 11/3024
See application file for complete search history.

(56) References Cited

U.S. PATENT DOCUMENTS 6,775,787 B2   8/2004   Greene
7,287,173 B2 * 10/2007  Hsieh .................... G06F 8/4432
                                                     713/300
(Continued)

FOREIGN PATENT DOCUMENTS

EP        1734446 A1      12/2006
WO    WO/2005093569 A1    10/2005
(Continued)

OTHER PUBLICATIONS

Mohamed Gomaa, Michael D. Powell, and T. N. Vijaykumar. 2004. Heat-and-run: leveraging SMT and CMP to manage power density through the operating system. SIGOPS Oper. Syst. Rev. 38, 5 (Oct. 2004), 260-270.*

(Continued)

*Primary Examiner* — Aimee Li
*Assistant Examiner* — Kasim A Alli
(74) *Attorney, Agent, or Firm* — William A. Kinnaman, Esq.; Kevin P. Radigan, Esq.; Heslin Rothenberg Farley & Mesiti P.C.

(57) ABSTRACT

An instruction control interface is provided for automatically controlling assigning of one or more instructions for processing by one or more processor cores of a computing device. The control interface separately monitors temperatures of multiple logic units within each processor core of the processor core(s) of the computing device, and controls assigning of one or more instructions for processing by a particular processor core(s) based, at least in part, on the separately monitored temperatures of the multiple logic units within the processor core(s). By separately monitoring temperature of logic units within a processor core, the interface automatically determines whether to assign the current instruction for execution without temperature-induced change, whether to reassign the instruction(s) to (Continued)

another processor core, whether to convert the current instruction to execute on different logic units of a particular processor core than the current instruction(s), or to reorder a sequence of execution of the instruction(s).

10 Claims, 6 Drawing Sheets

(56) References Cited

U.S. PATENT DOCUMENTS

| | | | |
|---|---|---|---|
| 7,673,158 | B2 | 3/2010 | Dang et al. |
| 8,381,004 | B2 | 2/2013 | Elozahy et al. |
| 8,516,460 | B2 * | 8/2013 | Bates .................... G06F 8/4432 702/130 |
| 2004/0215988 | A1 | 10/2004 | Clabes et al. |
| 2006/0101289 | A1 | 5/2006 | Dang et al. |
| 2007/0208959 | A1 | 9/2007 | Tani |
| 2008/0028236 | A1 | 1/2008 | Capps et al. |
| 2011/0016342 | A1 | 1/2011 | Rowan et al. |
| 2012/0096293 | A1 | 4/2012 | Floyd et al. |
| 2012/0105050 | A1 | 5/2012 | Naffziger et al. |
| 2012/0130657 | A1 | 5/2012 | Eckert et al. |
| 2012/0159216 | A1 | 6/2012 | Wells et al. |
| 2012/0179301 | A1 | 7/2012 | Aivaliotis et al. |
| 2014/0006818 | A1 | 1/2014 | Doshi et al. |
| 2014/0143558 | A1 | 5/2014 | Kuesel et al. |
| 2014/0189377 | A1 | 7/2014 | Subbareddy et al. |

FOREIGN PATENT DOCUMENTS

| | | |
|---|---|---|
| WO | WO/2010087949 A1 | 8/2010 |
| WO | WO/2013095603 A1 | 6/2013 |
| WO | WO/2013147906 A1 | 10/2013 |

OTHER PUBLICATIONS

Haijun, Sun, et al; "The research on optimization techniques of 32-bit floating-point RISC microprocessor." InVLSI Design and Video Technology, 2005. Proceedings of 2005 IEEE International Workshop on, pp. 63-66. IEEE, 2005.

Poirier, Christopher, et al; "Power and temperature control on a 90nm Itanium®-family processor." In Solid-State Circuits Conference, 2005. Digest of Technical Papers. ISSCC. 2005 IEEE International, pp. 304-305. IEEE, 2005.

Alon Naveh et al., "Power and Thermal Management in the Intel® CoreTM Duo Processor", Intel Technology Journal, 2006.

Mitran et al., "Computer System Using Partially Functional Processor Core", U.S. Appl. No. 14/595,465, filed Jan. 13, 2015 (50 pages).

* cited by examiner

THERMAL AVAILABILITY BASED INSTRUCTION ASSIGNMENT FOR EXECUTION

BACKGROUND

The power dissipation of integrated circuit chips, such as processor chips, and the modules containing the chips, continues to increase in order to achieve increases in processor performance. This trend poses challenges at both the chip and system levels.

Power density is currently a major limiter of design performance. Power dissipation increases chip temperature, and fluctuations on a given processor chip can exceed 50° C., which can in turn cause discrepancies in transistor performance and result in reliability issues. High temperatures increase likelihood of timing or physical failures through electro-migration, as well as increasing device leakage current, which can lead to thermal runaway. These and other power-related effects drive the concept of 'dark silicon', which refers to the constraint that only so many transistors may be used simultaneously within a given thermal envelope. This limitation in the number of transistors available for simultaneous use imposes limits on a processor's capabilities and/or performance.

There are a number of cooling approaches to controlling temperature variations across a processor chip comprising one or more processor cores. These cooling approaches include providing a cooling airflow across the processor chip and/or heat sink coupled to the processor chip, as well as liquid-cooling solutions, wherein liquid passing through a liquid-cooled structure coupled to the processor chip absorbs heat dissipated by the chip. In other approaches, overall operation of the computer chip may be directly controlled in order to constrain heat dissipation from the chip. For instance, performance of the processor chip may be uniformly throttled in order to control heat dissipation from the chip. The disadvantage to this approach, however, is the reduced processing through-put resulting from throttling of the processor chip.

BRIEF SUMMARY

The shortcomings of the prior art are overcome and additional advantages are provided through the provision of a method which includes: separately monitoring temperatures of multiple logic units within one processor core of at least one processor core of a computing device; and automatically controlling assigning of one or more instructions for processing by the at least one processor core based, at least in part, on the separately monitored temperatures of the multiple logic units within the one processor core.

In another aspect, a computer system is provided which includes a memory; at least one processor core, the at least one processor core being in communications with the memory; and an instruction control interface, the instruction control interface performing a method comprising: separately monitoring temperatures of multiple logic units within one processor core of the at least one processor core; and automatically controlling assigning of one or more instructions for processing by the at least one processor core based, at least in part, on the separately monitored temperatures of the multiple logic units within the one processor core.

In a further aspect, a computer program product is provided for controlling assignment of instructions to one or more processor cores of a computing system. The computer program product comprises a computer-readable storage medium readable by a processor and storing instructions for execution by the processor for performing a method comprising: separately monitoring temperatures of multiple logic units within one processor core of at least one processor core of a computing device; and automatically controlling assigning of one or more instructions for processing by the at least one processor core based, at least in part, on the separately monitored temperatures of the multiple logic units within the one processor core.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

As noted, power density is often a major limiter of circuit design performance. The concept of "dark silicon" states that only so many transistors may be used simultaneously while maintaining operation within a given thermal envelope. The power density issue may manifest as temperature fluctuations across, for instance, a processor chip. In certain implementations, multiple processor cores, such as eight or more, may be provided on a given processor chip, and temperature variations across a chip during operation can sometimes exceed 50° C. The effects of chip hot spots are varied. For example, there is an exponential dependence with leakage and electro-migration, and there is a linear dependence on wire resistance, and threshold voltage, and the impact on the drain current is somewhere between linear and exponential (that is, depends on $|VGS-V_T|$).

Thus, it would be advantageous to reduce hot spot formation as much as possible, while maintaining chip performance. This may be accomplished, in one or more aspects, by the processing disclosed herein, by broadening the area over which power is dissipated. By way of example, the embodiments disclosed below utilize the concept of "available thermal resources per core", or "available thermal bandwidth per core logic unit" as a way of measuring performance in terms of how close a particular processor core is to operating at a thermal envelope thresholds. By adding temperature sensors to, for instance, every core logic unit, or at least every critical logic unit or every higher-heat producing logic unit, and, for instance, storing output of that information in a database, such as a look-up table, processing may be provided to create a fine-grain thermal snapshot, and even predict heating trends. This information may advantageously be used by the computer system to distribute instructions to other cores, reorder instructions being issued to a particular core (while maintaining memory dependencies), or to convert at runtime instructions to match thermal resources available in a particular core.

In one or more implementations, the processing and instruction control interface disclosed herein may be implemented in software, such as by a runtime virtual machine, or in hardware, or any combination of software and hardware. As described further below, if a particular core may be overheating in one logic unit, such as a floating point unit, then the instructions to be executed by that unit could be reordered to space out the repeating floating point instructions to that core, or the instructions could be converted to, for instance, fixed point operations to avoid the overtemperature floating point logic unit. Before describing embodiments of the present invention in greater detail, exemplary computing environments within which the processing disclosed herein may be implemented are first discussed.

Figure 1:
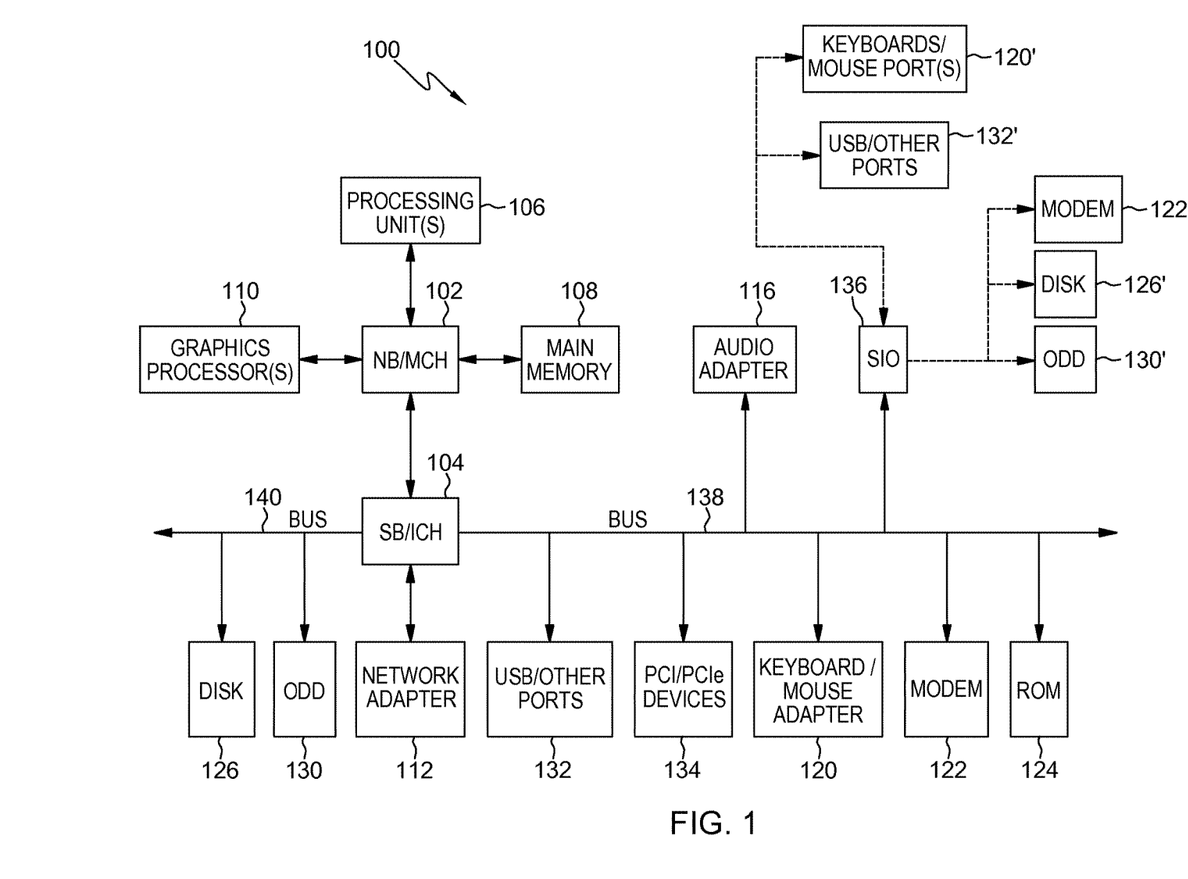
FIG. 1 depicts an exemplary data processing system to implement one or more aspects of the present invention.
Figure 2:
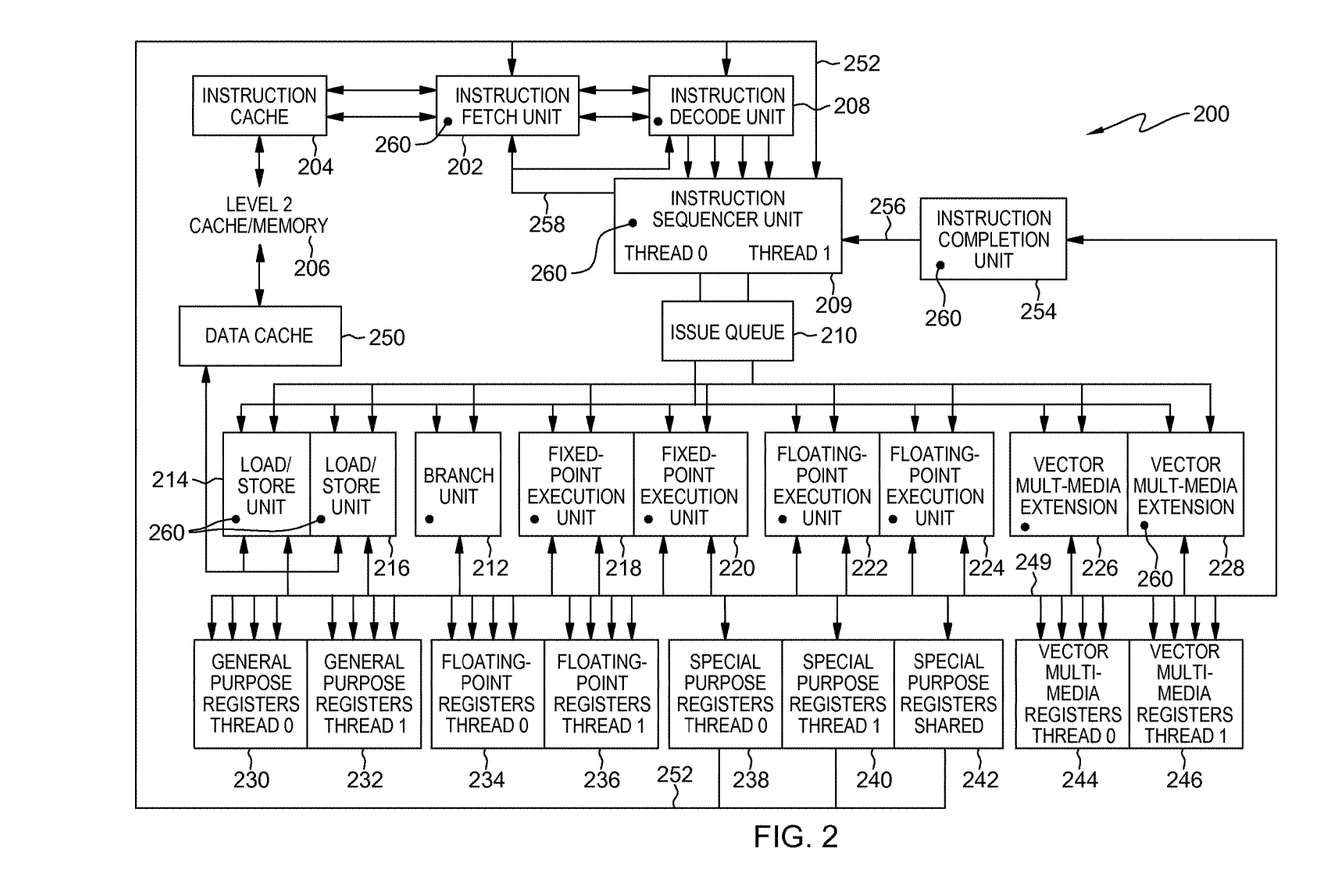
FIG. 2 depicts an exemplary block diagram of a dual-threaded processor core design, showing exemplary logic units, which may be separately temperature monitored, in accordance with one or more aspects of the present invention.

FIGS. 1 and 2 show example environments in which aspects of the illustrative embodiments can be implemented. While the description following the FIGS. 1 and 2 discussion below focuses primarily on a single multiple core processor implementation for assigning instructions, this is only an example and is not intended to state or imply any limitation with regard to the features of the present invention. Additional examples of computing environments in which embodiments of the invention disclosed herein can be implemented may be found in the art, for instance, reference the computing environment disclosed in U.S. Pat. No. 8,381,004. Note also that the discussion herein of processing or executing "instructions" is inclusive of processing or executing tasks, each of which may include one or more instructions for execution.

FIG. 1 depicts a data processing system 100, which is an example of a computer system in which components, circuits, and/or computer-usable/-executable code or instructions implementing the processes of embodiments of the invention disclosed herein can be located. In the depicted example, data processing system 100 can employ a hub architecture including north bridge and memory controller hub (NB/MCH) 102 and south bridge and input/output (I/O) controller hub (SB/ICH) 104. Processing unit 106, main memory 108, and graphics processor 110 can be connected to NB/MCH 102. Graphics processor 110 can be connected to NB/MCH 102 through an accelerated graphics port (AGP) or the like. A local area network (LAN) adapter 112 can connect to SB/ICH 104, and an audio adapter 116, keyboard and mouse adapter 120, modem 122, read only memory (ROM) 124, hard disk drive (HDD) 126, optical disc drive (ODD) 130, universal serial bus (USB) ports and other communication ports 132, and PCI/PCIe devices 134 can connect to SB/ICH 104 through bus 138 and bus 140. ODD 130 can include a CD-ROM or - RAM drive, a DVD-ROM or - RAM drive, a Bluray drive, or any other suitable optical disc drive. PCI/PCIe devices can include, for example, Ethernet adapters, add-in cards, and PC cards for notebook computers. PCI uses a card bus controller, while PCIe does not. ROM 124 can be, for example, a flash basic input/output system (BIOS).

HDD 126 and ODD 130 can connect to SB/ICH 104 through bus 140. HDD 126 and CD-ROM drive 130 can use, for example, an integrated drive electronics (IDE) or serial advanced technology attachment (SATA) interface. In addition, a super I/O (SIO) device 136 can be connected to SB/ICH 104 via bus 138 to provide connectivity to keyboard/mouse ports 120', disk port(s) 126', USB and/or other ports 132', such as serial and/or parallel ports, and/or other I/O ports as may be desired. Where SIO 136 is employed, the ports it provides can be in addition to those provided elsewhere or can replace like ports depicted in FIG. 1. Thus, where SIO 136 is employed to provide keyboard and mouse ports 120', keyboard and mouse adapter 120 can be eliminated or connected via SIO 136, as can USB and other ports 132, disk 126, ODD 130, and/or any other suitable ports depicted in FIG. 1.

An operating system can run on processing unit(s) 106 and can coordinate and provide control of various components within data processing system 100 in FIG. 1. The operating system can be any suitable operating system, such as, but not limited to, IBM® Advanced Interactive Executive (AIX®), Microsoft® Windows®, Apple® MacOSX®, and/or LINUX®. In addition, a programming system, such as an object-oriented programming system like the Java™ programming system or a procedural programming language like C, can run in conjunction with the operating system and can provide calls to the operating system from programs or applications of the programming system executing on data processing system 100. (AIX® is a trademark of International Business Machines Corporation, Microsoft® and Windows® are trademarks of Microsoft Corporation, Apple® and MacOSX® are trademarks of Apple Computer, Inc., Java® is a trademark of Sun Microsystems, Inc., and LINUX® is a trademark of Linus Torvalds.)

As a server, data processing system 100 can be, for example, an IBM® System p® or an IBM® System z® computer system, running AIX® or LINUX® (System p and System z are trademarks of International Business Machines Corporation). Data processing system 100 can be a symmetric multiprocessor (SMP) system including a plurality of processors in processing unit 106. For example, processing unit 106 could include a plurality of multi-core processor chips connected via multi-chip module links. Alternatively, a single processor system can be employed. Each processor can include multiple cores, which can each include multiple execution units or other processing resources as will be explained below.

Instructions for the operating system, the programming system, and applications or programs can be located on non-transitory computer readable storage media in storage devices, such as disk 122, ROM 124, HDD 126, ODD 130, and/or other storage devices, and can be loaded into main memory 108 for execution by processing unit(s) 106. The processes of embodiments of the invention disclosed herein can be performed by processing unit(s) 106 using computer usable program code, which can be located in a memory such as, for example, main memory 108, ROM 124, or in one or more peripheral devices, such as HDD 126 and ODD 130, for example, or any other non-transitory computer readable storage medium or device. A memory can include, for example, in addition to main memory 108 and ROM 124, one or more RAM devices or a cache memory as part of NB/MCH 102 in FIG. 1.

A bus system, such as bus 138 and/or bus 140 as shown in FIG. 1, can include one or more buses and can be implemented using any type of communication architecture that provides for a transfer of data between different components or devices attached to the fabric or architecture. A communication unit, such as modem 122 or network adapter 112 of FIG. 1, can include one or more devices used to transmit and receive data.

Those of ordinary skill in the art will appreciate that the hardware in FIG. 1 may vary depending on the implementation. Other internal hardware or peripheral devices, such as flash memory, equivalent non-volatile memory, solid state drives (SSDs), or optical disc drives and the like, may be used in addition to or in place of the hardware depicted in FIG. 1. Also, the processes of the illustrative embodiments can be applied to a multiprocessor data processing system without departing from the spirit and scope of the present invention. Moreover, data processing system 100 can take the form of any of a number of different data processing systems including client computing devices, server computing devices, a tablet computer, laptop computer, telephone or other communication device, a personal digital assistant (PDA), a smartphone, or the like. In some embodiments, data processing system 100 can be a portable computing device configured with flash memory to provide non-volatile memory for storing operating system files and/or user-generated data, for example. Essentially, data processing system 100 may be any known or later developed data processing system without architectural limitation.

With data processing system 100 of FIG. 1, processing unit 106 can have facilities for processing both integer and floating-point instructions and operating on both types of data. However, in accordance with one or more embodiments, processing unit 106 can have hardware facilities for handling SMP instructions and data as floating-point SMP instructions and data. The scalar facilities are used for integer processing, and in conjunction with the floating-point SMP architecture for internal loop control and memory access control.

Referring to FIG. 2, an exemplary block diagram of a dual-threaded processor core design showing functional units and registers is depicted in accordance with an illustrative embodiment. Processor core 200 can be implemented in a processor, such as processing unit 106 in FIG. 1, in these illustrative examples. Processor core 200 can comprise a single integrated circuit superscalar microprocessor with dual-thread simultaneous multi-threading (SMT) that may also be operated in a single-threaded mode. Accordingly, as discussed further herein below, processor core 200 can include various logic units, registers, buffers, memories, and other sections, all of which can be formed by integrated circuitry. Also, in an illustrative embodiment, processor core 200 can operate according to reduced instruction set computer (RISC) techniques.

As shown in FIG. 2, an instruction fetch unit (IFU) 202 can connect to an instruction cache 204. Instruction cache 204 can hold instructions for multiple programs (threads) to be executed. Instruction cache 204 can also include an interface to level 2 (L2) cache/memory 206. IFU 202 can request instructions from instruction cache 204 according to an instruction address, and can pass instructions to instruction decode unit 208. In an illustrative embodiment, IFU 202 can request multiple instructions from instruction cache 204 for up to two threads at the same time. Likewise, instruction decode unit 208 can decode multiple instructions for one or more threads at the same time and can pass decoded instructions to instruction sequencer unit (ISU) 209.

Processor core 200 can also include issue queue 210, which can receive decoded instructions from ISU 209. Instructions can be stored in issue queue 210 while awaiting dispatch or assignment to appropriate execution units. For an out-of order processor to operate in an in-order manner, ISU 209 can selectively issue instructions quickly using false dependencies between each instruction. If an instruction does not produce data, such as in a read after write dependency, ISU 209 can add an additional source operand (also referred to as a consumer) per instruction to point to the previous target instruction (also referred to as a producer). Issue queue 210, when issuing the producer, can then wakeup the consumer for issue. By introducing false dependencies, a chain of dependent instructions can be created such that the instructions can be issued in-order. ISU 209 can use the added consumer for instruction scheduling purposes and the instructions, when executed, need not actually use the data from the added dependency. Once ISU 209 selectively adds any required false dependencies, issue queue 210 can take over and can issue the instructions in order for each thread, and can output or issue instructions for each thread to execution units 212, 214, 216, 218, 220, 222, 224, 226, and 228 of the processor. This process will be described in more detail in the following description.

In an illustrative embodiment, the execution units of the processor can include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 can be shared fully across both threads, meaning that execution units 212, 214, 216, 218, 220, 222, 224, 226, and 228 can receive instructions from either or both threads. The processor can include multiple register sets 230, 232, 234, 236, 238, 240, 242, 244, and 246, which can also be referred to as architected register files (ARFs).

An ARF is a file where completed data is stored once an instruction has completed execution. ARFs 230, 232, 234, 236, 238, 240, 242, 244, and 246 can store data separately for each of the two threads and by the type of instruction, namely general purpose registers (GPRs) 230 and 232, floating-point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally can include a set of shared special purpose registers (SPR) 242 for holding program states, such as an instruction pointer, stack pointer, or processor status word, which can be used on instructions from either or both threads. Execution units 212, 214, 216, 218, 220, 222, 224, 226, and 228 can be connected to ARFs 230, 232, 234, 236, 238, 240, 242, 244, and 246 through a simplified internal bus structure 249.

To execute a floating-point instruction, FPUA 222 and FPUB 224 can retrieve register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs. For example, FPUA 222 can input completed data to FPR 234 and FPUB 224 can input completed data to FPR 236, because FPUA 222, FPUB 224, and FPRs 234 and 236 are thread specific.

During execution of an instruction, FPUA 222 and FPUB 224 can output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 can output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 can output their destination register operand data to SPRs 238, 240, and 242 when the instruction has passed the point of flushing in the pipeline. Program states, such as an instruction pointer, stack pointer, or processor status word, stored in SPRs 238 and 240 can indicate thread priority 252 to ISU 209. During execution of an instruction, VMXA 226 and VMXB 228 can output their destination register operand data to VRs 244 and 246 when the instruction has passed the point of flushing in the pipeline.

Data cache 250 can also have associated with it a non-cacheable unit (not shown) which can accept data from the processor and write it directly to level 2 cache/memory 206. In this way, the non-cacheable unit can bypass coherency protocols that may be imposed for storage to cache.

In response to the instructions input from instruction cache 204 and decoded by instruction decode unit 208, ISU 209 can selectively dispatch the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 can execute one or more instructions of a particular class or type of instructions. For example, FXUA 218 and FXUB 220 can execute fixed-point mathematical operations on register source operands, such as addition, subtraction, ANDing, ORing and XORing, while FPUA 222 and FPUB 224 can execute floating-point mathematical operations on register source operands, such as floating-point multiplication and division. Additionally, LSUA 214 and LSUB 216 can execute load and store instructions, which move operand data between data cache 250 and ARFs 230, 232, 234, and 236, and VMXA 226 and VMXB 228 can execute single instruction operations that include multiple data. Further, branch unit 212 can execute branch instructions which conditionally alter the flow of execution through a program by modifying the instruction address used by IFU 202 to request instructions from instruction cache 204.

Instruction completion unit 254 can monitor internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. In some implementations, instructions executed by branch unit 212, FXUA 218, FXUB 220, LSUA 214, and LSUB 216 may require the same number of cycles to execute, while instructions executed by FPUA 222, FPUB 224, VMXA 226, and VMXB 228 may require a variable, larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 can monitor for the completion of instructions, and can send control information 256 to ISU 209 to notify ISU 209 that more groups of instructions can be dispatched to execution units 212, 214, 216, 218, 220, 222, 224, 226, and 228. ISU 209 can send dispatch signal 258, which serves as a throttle to bring more instructions down the pipeline to the dispatch unit, to IFU 202 and instruction decode unit 208 to indicate that it is ready to receive more decoded instructions. While processor core 200 provides one detailed description of a single integrated circuit superscalar microprocessor with dual-thread simultaneous multi-threading (SMT) that may also be operated in a single-threaded mode, the illustrative embodiments are not limited to such microprocessors. That is, the illustrative embodiments may be implemented in any type of processor which provides multi-threaded operation, whether this be two simultaneous threads (SMT2), four simultaneous threads (SMT4), or more simultaneous threads.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system without departing from the spirit and scope of the present invention.

With regard to the illustrative embodiments, the data processing system can include one or more processor cores, each having at least one hardware thread, where each of these hardware threads may run tasks independently of the other thread(s). In some cases, the hardware threads may compete among themselves for the available core resources, such as pipeline slots, queues, buffers, core's cache memory, and core's memory bandwidth. Such competition may degrade the applications' individual performances, although it may utilize the core resources to the maximum. In some cases, the data processing system can operate at reduced frequency and voltage levels, which in turn can reduce energy consumption. For example, a system with cores that allow dynamic voltage and frequency scaling (DVFS) can be operated in a manner to allow the data processing system to globally trade potentially lower performance in return for lower energy consumption by reducing the operating frequency and voltage. Processor cores operating at higher voltage and frequencies generally consume more power than those operating at lower voltage and frequencies. Power consumption is a non-linear function of voltage and frequency.

In the illustrative embodiments, a user application may run one or more tasks, each including a plurality of instructions. Each task has a desired maximum number of competing threads that specifies the maximum number of threads that could be running on the core without seriously degrading the task's individual performance. The task's performance will likely degrade with increasing the number of threads running on the same core beyond this maximum.

Figure 3:
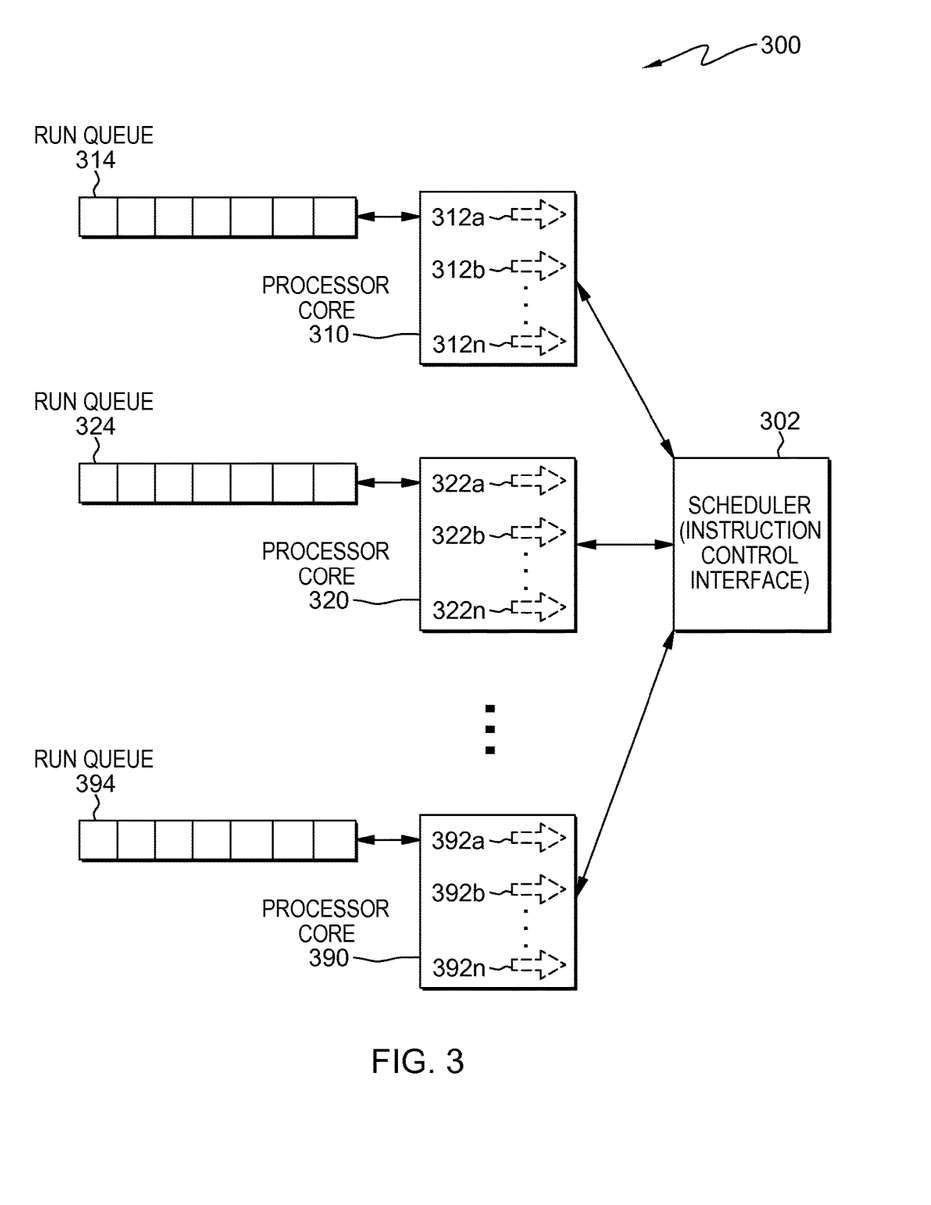
FIG. 3 depicts an exemplary data processing system with a plurality of processor cores to be controlled, in accordance with one or more aspects of the present invention.

Referring to FIG. 3, an exemplary data processing system is depicted with a plurality of processor cores in accordance with an illustrative embodiment. Data processing system 300 can include scheduler 302 and processor cores 310, 320, . . . , 390. Processor cores 310-390 can be implemented on a single chip or can be implemented on various processor chips. Each of processor cores 310-390 can include several hardware threads 312a-312n, 322a-322n, and 392a-392n, respectively. Each of hardware threads 312a-312n, 322a-322n, and 392a-392n can run application tasks independently, and each of hardware threads 312a-312n, 322a-322n, and 392a-392n can include all resources needed to store the state of the software thread that is dispatched by the operating system to run on the hardware thread, such as that depicted in FIG. 2. Hardware threads 312a-312n, 322a-322n, and 392a-392n compete among themselves for the computational and communication resources available on the processor core. For example, they compete for the pipelines, data paths to caches, and overall communication bandwidth. Data processing system 300 can also include run queues 314, 324, and 394 corresponding to processor cores 310, 320, and 390, respectively. Run queues 314, 324, and 394 are typically stored in the system memory and are managed by the operating system to ensure proper management of the processor cores 310-390.

In the illustrative embodiments, scheduler 302 can compute specific performance characteristics for each of run queues 314, 324, and 394. To express the size of the work that is queued in a particular one of run queues 314, 324, or 394, scheduler 302 can divide the length of the nm queue by the number of active hardware threads on the respective one of processor cores 310, 320, or 390. This value, referred to as a load coefficient, gives an indication for the amount of waiting that tasks will experience according to queuing theory. For example, four tasks queued on a processor core that has two active hardware threads will experience more waiting on average than five tasks queued on a processor core that has three active hardware threads. Furthermore, scheduler 302 can designate a threshold below which it is acceptable to add more tasks to the run queue. Scheduler 302 can consider a processor core having a load coefficient at or below this threshold to not be overloaded, whereas scheduler 302 can consider a processor core having a load coefficient above this threshold to be overloaded and ignores the processor core as a candidate for admitting more tasks unless data processing system 300 is experiencing large overload conditions. The threshold may be a user-defined value that is workload-dependent, environment-dependent, or a product of any appropriately user-defined factors, such as desired response time, system utilization caps, or the like. Scheduler 302 can assign tasks based on performance and/or power conservation. As disclosed herein, an instruction control interface may be provided and associated, in one or more implementations, with the scheduler, to dynamically control or change assignment of instructions for execution by particular processor cores of a computing device or environment, such as described above, based on thermal readings.

Generally stated, disclosed herein is a method for managing available thermal resources or available thermal bandwidth within processor cores of a computing device. The method includes: separately monitoring temperatures of multiple logic units within one or more processor cores of the computing device, and automatically controlling assigning of the one or more instructions for processing by the processor core(s) based, at least in part, on the separately monitored temperatures of the multiple logic units within the one processor core.

Separately monitoring temperatures of multiple logic units can be achieved, in one or more implementations, by associating temperature sensors 260 with selected logic units of a processor core, such as depicted in FIG. 2. In one or more implementations, each logic unit within the processor core may have associated therewith one or more temperature sensors in order to independently monitor temperature of that logic unit within the particular processor core. One embodiment of this processing is depicted in of FIG. 4, where available thermal resources 400 are monitored by sensing temperatures at the core logic units 410. Note that, in certain implementations, every logic unit within a particular processor core may have associated therewith a temperature sensor for monitoring its temperature. In other embodiments, only selected logic units within a particular processor core may have temperature sensors associated therewith. For instance, based on historical data, temperature sensors may only need to be associated with selected logic units within the processor core which may be subject to excessive heating.

Figure 4:
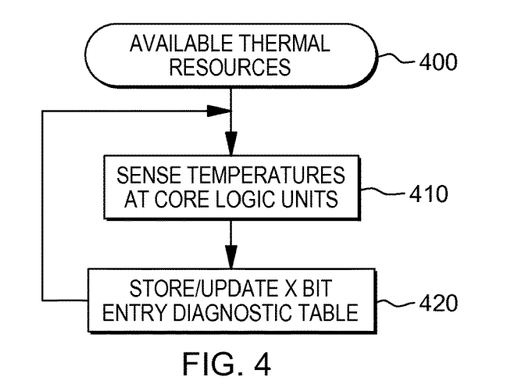
FIG. 4 depicts an exemplary process for monitoring core logic unit resources within a computing device for available thermal bandwidth, in accordance with one or more aspects of the present invention.

As illustrated in FIG. 4, in one or more implementations, the temperatures may be stored as or used to update an x-bit entry for every logic unit of a processor core in a diagnostic look-up table that feeds the instruction control interface (which as noted, in one or more implementations, may be implemented as a virtual machine).

By way of example, a two-bit entry may be employed within a look-up table, such as Table 1 below, for every logic unit in every processor core of a process chip.

TABLE 1

| Core | Fixed Point Unit (FXU) | Digital Floating Point Unit (DFU) | Vector Scaler Unit (VSU) | Load Store Unit (LSU) | ... | Cache (L2) |
|---|---|---|---|---|---|---|
| 1 | 00 | 11 | 11 | 11 | ... | 11 |
| 2 | 11 | 01 | 11 | 11 | ... | 11 |
| 3 | 11 | 11 | 11 | 11 | ... | 11 |
| 4 | 11 | 11 | 11 | 10 | ... | 11 |
| ... | ... | ... | ... | ... | ... | ... |
| X | 11 | 11 | 11 | 11 | ... | 11 |

Where, for instance:
'00'—Logic unit exceeds excessive temperature threshold, take emergency action,
'01'—Logic unit is close to excessive temperature threshold, avoid if possible,
'10'—Logic unit is warm, but may be used for instruction execution, and
'11'—Logic unit is cool, and may be used for instruction execution without restriction.

With the sensed temperatures regularly updated in a database, such as in the above-illustrated look-up table, the instruction control interface may control instruction assignment based on temperatures of individual logic units within particular processor cores. Thus, fine-grain thermal control of instruction execution within one or more processor cores of the chip may be achieved. Note that the sensed temperature of the core logic units may also be stored in memory to, for instance, predict thermal trends within individual logic units of a processor core, or across the processor cores, and take action based thereon.

As explained below, a variety of control actions may be taken by the instruction control interface to manage the available thermal resources. For instance, where the computing device includes a plurality of processor cores, the automatically controlling assigning of the one or more instructions may comprise automatically reassigning the one or more instructions for processing to another processing core of the plurality of processor cores based, at least in part, on the separately monitored temperatures of the multiple logic units within one or more of the processor cores. As noted, in one or more implementations, each processor core comprises multiple logic units, and each logic unit (or selected logic units) may have associated therewith a temperature sensor in order to closely track the available thermal resources. In one or more enhanced embodiments, the reassigning may include automatically controlling reassigning of the one or more instructions to the another processor core based, at least in part, on the separately monitored temperatures of the multiple logic units of multiple processor cores, including the another processor core.

In one or more embodiments, the automatically controlling assigning may include automatically converting the one or more instructions to one or more converted instructions for execution on a particular processor core based, at least in part, on the separately monitored temperatures of the multiple logic units within that processor core. The automatically converting may change the current instruction(s) from one for execution via at least one logic unit of the multiple logic units within the processor core to one or more converted instructions for execution by at least one other logic unit of the multiple logic units within the one processor core. This automatically converting may be performed, at least in part, by a just-in-time (JIT) compiler of the computing device.

In certain embodiments, the automatically controlling assigning may include automatically reordering a sequence of execution of the instructions by the processor core(s) based, at least in part, upon the separately monitored temperatures of the multiple logic units within the processor core(s). The reordering of the sequence of execution of the instruction(s) may include or result in selectively delaying execution of one or more of the instructions by the processor core(s) based, at least in part, on the instruction type of the one or more instructions, and the selectively monitored temperatures of the multiple logic units within the processor core(s).

In certain embodiments, the automatically controlling assigning may utilize, at least in part, an anticipated temperature rise of at least one logic unit of the multiple logic units within a particular processor core, if the one or more instructions are to be executed at that processor core, in combination with the separately monitored temperatures of the multiple logic units of the processor core, in determining how to assign the one or more instructions for execution. This may correspond, for instance, to a '01' value within the look-up table discussed above for a particular core logic unit to be involved in execution of the one or more instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5A:
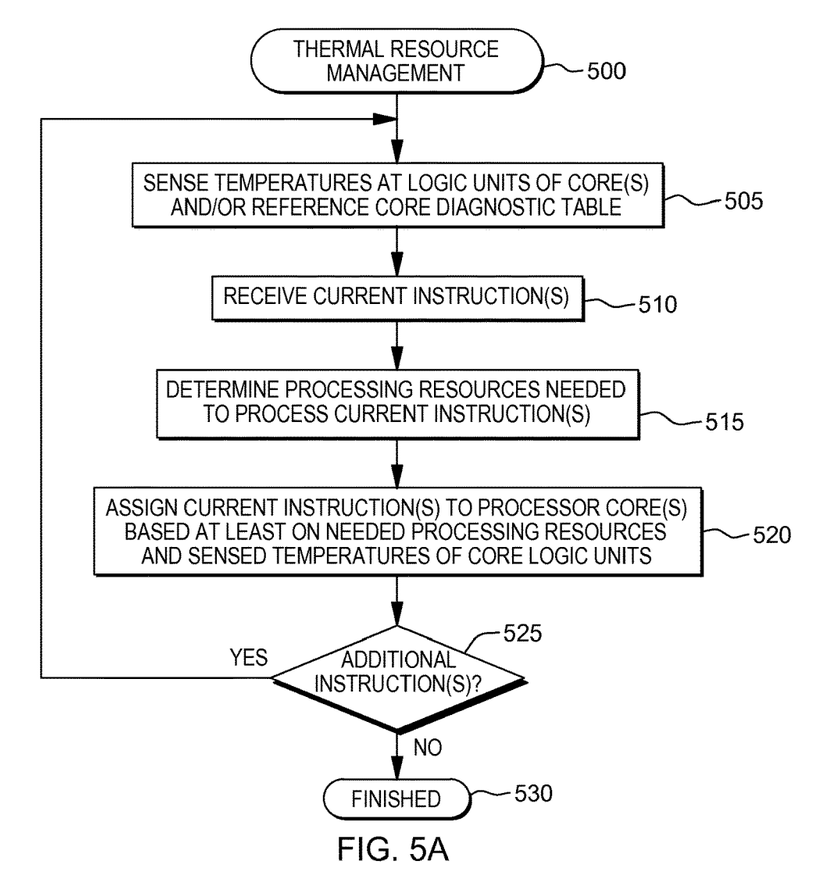
FIG. 5A depicts one embodiment of a process for managing processor core resources based on available thermal bandwidth of the core logic units, in accordance with one or more aspects of the present invention.
Figure 5B:
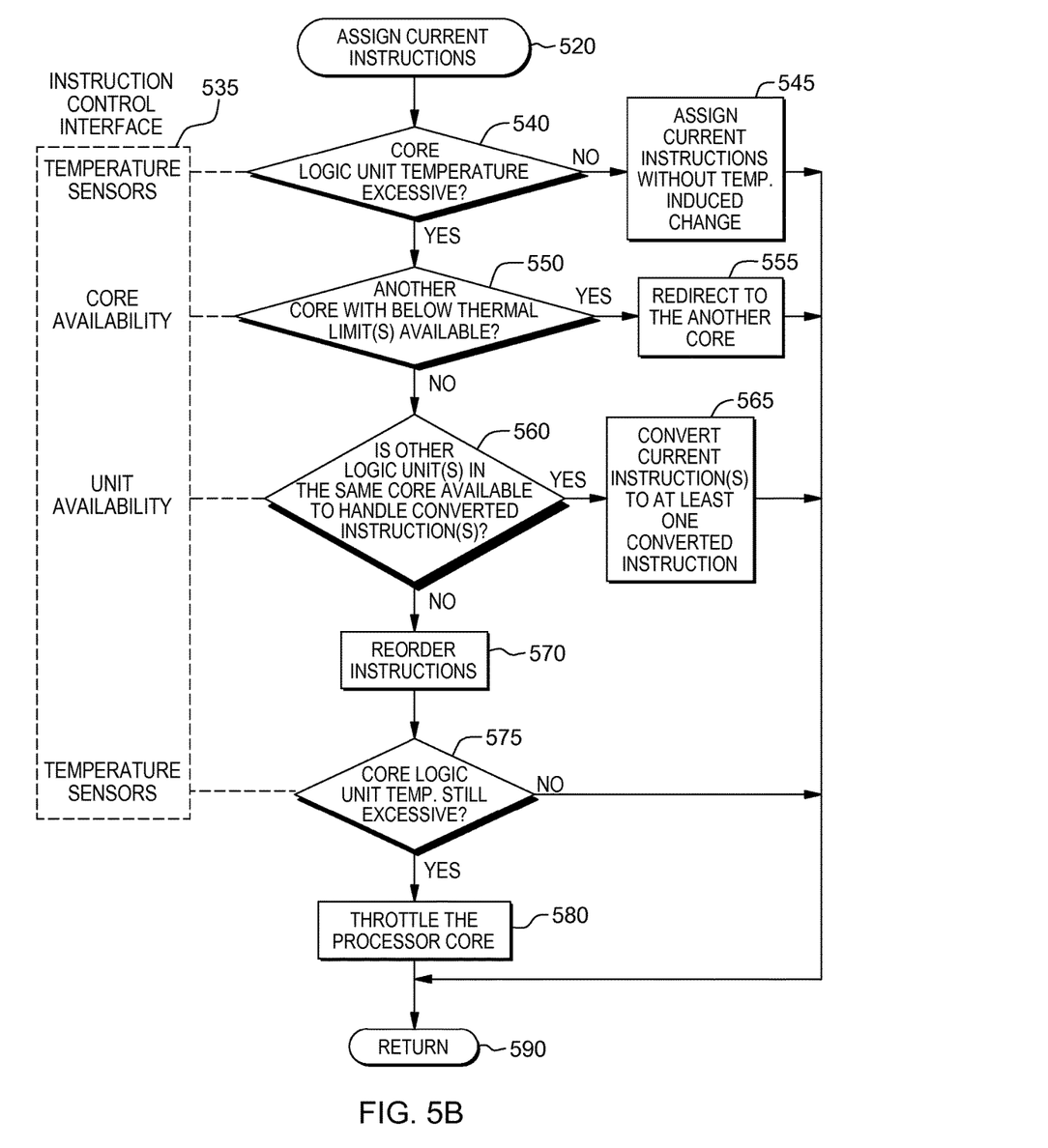
FIG. 5B depicts one embodiment of a process for controlling assignment of one or more current instructions to processor cores based, at least in part, on sensed temperatures of core logic units, in accordance with one or more aspects of the present invention.

One embodiment of a thermal resource management process, in accordance with one or more aspects of the present invention, is depicted in FIGS. 5A & 5B. The thermal resource management 500 can be performed in software, firmware, or hardware. For instance, a runtime instruction control interface providing the thermal resource management could be provided within a scheduler, dispatcher, or hypervisor on a computing system (e.g., by software recompiling), or within individual processor cores, and/or a master core of a group of processor cores. The instruction control interface can sense or read the individual temperatures at the logic units of one or more of the cores, and/or reference a core diagnostics table, such as Table 1 illustrated above, which may be implemented at any desired location within the computing system, such as at a memory device 505. For example, the monitored temperatures of a core logic unit could be recorded on a computing device in a read-only memory, or the like. Alternatively, instruction pattern identification could be used in combination with sensed temperatures in determining whether to take action to change an instruction assignment for execution.

One or more current instructions are received 510 and the current instruction(s) is evaluated to determine what resources are required to process the instruction 515. Based, at least in part, on the sensed core logic unit temperatures, and the resources needed to process the current instruction(s), the current instruction(s) is assigned to a processor core for execution 520. Once the current instruction(s) is assigned, processing determines whether there are additional instructions 525, and if "yes", then repeats the processing for the new current instruction(s). If no additional instructions are to be assigned, processing is finished 530.

FIG. 5B depicts one embodiment of a protocol for assigning current instructions 520. As illustrated, the processing can be implemented by an instruction control interface 535, which as noted, could be provided in software, such as via a virtual machine, or in hardware, or a combination thereof.

The instruction control interface evaluates the processor cores, and in particular, the cores' logic unit temperatures to determine whether any temperature is excessive, that is, is at or above a defined (upper) temperature threshold 540. As noted, in one or more implementations, selected logic units within each processor core of a computing device may have associated therewith one or more respective temperature sensors which provide a reading of the temperature of those selected logic units. If no core logic unit temperature is above the set threshold, then the current instruction(s) may be assigned without any temperature-induced change using, for instance, conventional scheduling processes 545. Assuming that one or more core logic unit temperature is excessive, for instance, exceeds the defined temperature threshold, then the instruction control interface may determine whether another processor core of the plurality of processor cores of the computing device has logic unit temperatures below the set threshold 550. Note in this regard, that the instruction control interface processing of FIG. 5B may, in one or more implementations, follow conventional instruction assignment processing, and be provided as a thermal resource manager which may selectively change assignment of the one or more instructions. Thus, if the one or more instructions are initially designated for processing by one processor core, the instruction control interface disclosed herein may determine whether any needed logic unit of that one processor core exceeds the threshold, and if so, determines whether another processor core of the computing device has thermal limits below the threshold, and therefore, can better accommodate, in a thermal sense, processing of the one or more instructions 550. If "yes", then the one or more instructions are redirected to the another processor core 555 for execution.

Assuming that there is no other core with the required logic units below the defined threshold temperature, then processing determines whether there is a logic unit on the one processor core with the excessive logic unit temperature(s) which can handle the one or more instructions if converted to a different type of instruction 560. For instance, the instruction control interface may determine to convert a current floating point addition instruction to an integer addition instruction(s). In doing so, the instruction control interface may consider whether the converting of one instruction to, for instance, multiple instructions, may have too much of a power penalty to justify the reduced wait time, or whether converting one instruction to multiple instructions may have too much of a delay penalty compared to issuing other non-dependent instructions in the queue and waiting for the overheated logic unit to cool, or converting one instruction to multiple instructions may have a reliability penalty if, for instance, the integer addition unit is close to overheating itself. If a decision is made to convert the one or more current instructions to one or more converted instructions, then the current instruction(s) is converted 565, for instance, employing a just-in-time compiler.

Instruction conversion utilizes the concept of being able to perform a given functionality with multiple possible instructions, or groups of instructions. For example, assuming a floating point notation with concatenated $X_{sign}$, $X_{exponent}$, $X_{mantissa}$, a floating point instruction (AF+BF=CF) may be performed using a series of integer addition instructions as follows:

Subtract $A_{exponent}-B_{exponent}$      1

Shift $B_{mantissa}$ by the amount from (1) and set $C_{exponent}=A_{exponent}$      2

Add $A_{mantissa}+B_{mantissa}$ to get $C_{mantissa}$      3

If $A_{mantissa}+B_{mantissa}>102$, Shift $C_{mantissa}$ left and increment $C_{exponent}$.      4

This set of integer subtract, shift, add, shift, add, is a complete replacement of the floating point addition if the floating point unit is unavailable due to thermal constraints.

Assuming that the instruction control interface determines not to convert the one or more current instructions, then the one or more current instructions may be reordered 570. Reordering may involve changing a sequence of execution of instructions for a particular processor core. For instance, rather than sequentially executing multiple current instructions, the current instructions could be interspersed with other instructions, to time-delay their execution, where the other instructions do not require, or depend less on the particular logic unit identified with an excessive temperature. Once reordered, processing may optionally determine whether core logic unit temperature is still excessive 575, and if so, throttle the one or more processor cores 580 to globally address the overheating condition, before returning 590. By way of example, throttling the processor core may include, but not be limited to, one or more of inserting null operations into the core's pipeline, reducing clock frequency and/or reducing supply voltage.

Figure 6:
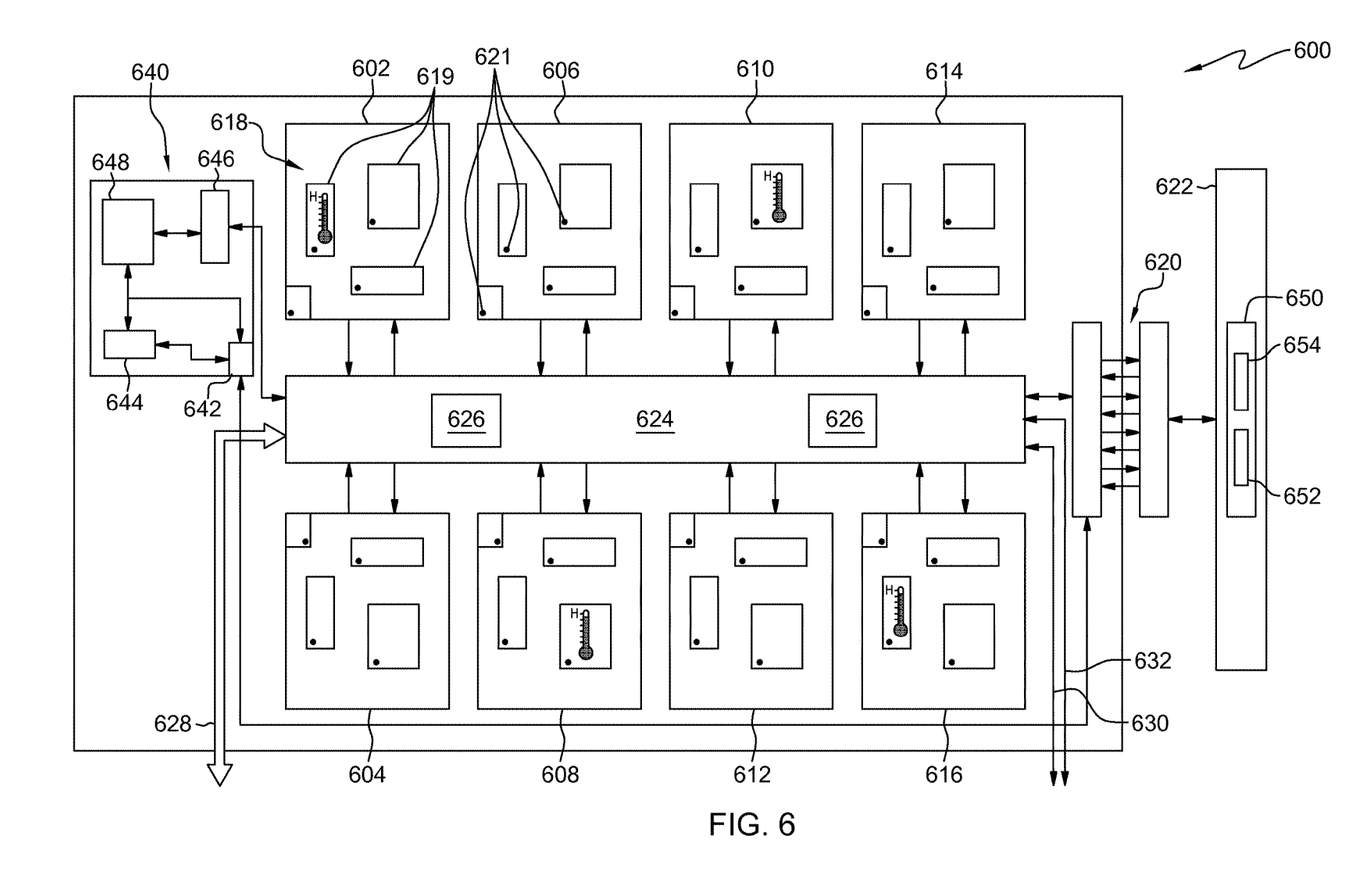
FIG. 6 depicts a block diagram of a data processing system comprising an exemplary instruction control interface that automatically controls assigning of instructions to processor cores based, at least in part, on the separately monitored temperatures of the processor core logic units, in accordance with one or more aspects of the present invention.

A schematic hardware representation of one or more embodiments of the above-described concepts is shown in FIG. 6. A computing system or computer system 600, such as a processing unit 106 of FIG. 1, can include a particular number of processor cores 602, 604, 606, 608, 610, 612, 614, 616. Each core can include multiple processing resources 618 and can, for example, take the form of core 200 of FIG. 2, though any other suitable core design can be used. Also, note that while eight cores are shown in FIG. 6, the number of cores can vary.

In the example of FIG. 6, processing resources 618 include multiple logic units 619 within each processor core 602, 604, 606, 608, 610, 612, 614, 616. As illustrated, in one or more implementations, each core logic unit 619 may have at least one thermal sensor 621 associated therewith (e.g., within the footprint of the logic unit) for monitoring temperature of that logic unit for, for instance, use in changing instruction assignment, as described herein.

Computing system 600 can also include one or more memory interface units 620 that can couple computing system 600 to one or more system main memory devices 622. For example, system main memory 622 can include main memory 108 of computing environment 100 of FIG. 1 via NB/MCH 102, though any other suitable arrangement can be used. Memory interface unit(s) 620 in embodiments can include a memory controller and/or a memory buffer, though other arrangements can be used as may be appropriate and/or desired. Memory interface unit(s) 620 can be connected to processor cores 602-616 via a system interconnect 624, which can also include additional memory devices 626, such as additional cache memory or the like. In embodiments, computing system 600 can include one or more SMP links 628 coupled to a supervisory device or program of a larger computing environment in which computing system 600 is deployed, such as computing environment 100 of FIG. 1. In addition, embodiments can include an off-MCM link 630 and an I/O link 632.

A system interface 640 (including an instruction control interface such as disclosed herein) can be introduced in embodiments that can assign a current instruction to a particular core based on workload of the cores, available processing resources in the cores, and the nature of the current instruction. Additionally, the instruction control interface disclosed herein may selectively change assignment of one or more current instructions to one or more processor cores in order to effect thermal resource management. Where an instruction is of a first type and an available core does not have a suitable execution unit or other processing resource below an acceptable temperature, embodiments can include a converter or translator, such as a just-in-time (JIT) compiler, that can convert a current instruction into one or more converted instructions compatible with the available core. In certain embodiments, such a converter or translator can be hard coded into system interface 640 or elsewhere in computing system 600.

With continued reference to FIG. 6, system interface 640 can include a first circuit 642 in communication with or coupled to memory interface unit 620 so as to receive system information 650 stored in system memory 622. System information 650 can include processor core temperatures 652 and available processing resource indicators 654.

System interface 640 can also include a second circuit 644 in communication with or coupled to first circuit 642 and can include components and/or code and/or instructions to determine what processing resources are needed to process the current instruction received by first circuit 642. A third circuit 646 can be connected to the plurality of processor cores 602-616, such as via system interconnect 624. A fourth circuit 648 in communication with or connected or coupled to first circuit 642, second circuit 644, and third circuit 646 can receive information from first circuit 642 and second circuit 644. Fourth circuit 648 can assign the current instruction to a processor core via the third circuit 646 in response to the needed processing resources, the temperature readings, and any available processing resources indicators received via the first and/or second circuits 642, 644. While system interface 640 has been described as including a particular number of circuits, it should be clear that one or more of circuits could be merged, and/or one or more of these circuits could be split into multiple additional circuits, as may desired and/or suitable.

Note that the illustrative embodiments disclosed advantageously provide mechanisms for scheduling instructions within or among processor cores in view of current logic unit thermal conditions, while giving the best tradeoff possible among system throughput, application performance, and energy consumption.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

In light of the description above, it should be understood that embodiments can be implemented in various fashions and at many levels within a computing system. For example, in a per-core implementation, an OS dispatcher/scheduler can start execution on a core not taking temperature into account. The core can determine how to handle instructions it receives, such as by directing an instruction to an execution unit. In this example, the OS need not receive any information about available processing resources within the cores since the cores themselves take care of the instructions they receive. In addition, indicators of available processing resources of cores can be omitted apart from each core keeping track of logic unit temperatures internally.

As another example, software and hardware can cooperate by using attribute codes to indicate what processing resources a particular program will demand. During compiling of the program, such codes can be passed into compiled output that can be combined with other compiled output, such as with a Binder or Linkage Editor, into an object, such as a Load Module, that can be loaded into the computing system. When the object is executed, the computing system Loader can copy the Load Module into memory and indicate what processing resources the program will demand, such as in one or more tables. During execution, the OS dispatcher can check the attribute codes to determine which cores should be used. The OS dispatcher thus can consider available processing resources in each core. It may also be advantageous to combine aspects of this example with the previous example.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

separately monitoring temperatures of multiple logic units within multiple processor cores of a plurality of processor cores of a computing device; and automatically controlling assigning of one or more instructions by an instruction control interface for processing by the multiple processor cores based, at least in part, on the separately monitored temperatures of the multiple logic units within the multiple processor cores, the automatically controlling assigning comprising:

determining, in association with assigning a current instruction to one processor core of the multiple processor cores, that a needed logic unit of the one processor core for executing the current instruction has a temperature that exceeds a set temperature threshold;

based on the determining, ascertaining whether an other processor core of the multiple processor cores has the needed logic unit with a temperature that is below the temperature threshold;

based on ascertaining that the other processor core has the needed logic unit with a temperature below the temperature threshold, redirecting the current instruction to the other processor core for execution;

based on ascertaining that no other processor core of the multiple processor cores has the needed logic unit with a temperature below the temperature threshold, then determining whether to convert the current instruction to another instruction for execution by an other logic unit of the multiple logic units of the one processor core;

based on determining to convert the current instruction, automatically converting the current instruction to at least one converted instruction for execution via the other logic unit of the one processor core;

based on determining not to convert the current instruction, reordering execution of the current instruction by changing a sequence of execution of instructions on the one processor core;

based on reordering execution of the current instruction by changing the sequence of execution of the instructions on the one processor core, determining whether a temperature of the one processor core is still excessive; and based on the temperature of the one processor core still being excessive, throttling the one processor core.

2. The method of claim 1, wherein the automatically converting is performed, at least in part, by a just-in-time (JIT) compiler of the computing device, which converts the current instruction to the one or more converted instructions.

3. The method of claim 1, wherein the changing the sequence of execution of the instructions by the one processor core comprises selectively delaying execution of the current instruction by the one processor core based, at least in part, on an instruction type of the current instruction and the separately monitored temperatures of the multiple logic units within the one processor core.

4. The method of claim 1, wherein the automatically controlling assigning utilizes, at least in part, an anticipated temperature rise of at least one logic unit of the multiple logic units within the one processor core if the current instruction is executed by the one processor core, in combination with the separately monitored temperatures of the multiple logic units within the one processor core in determining whether to assign the current instruction for execution by the one processor core.

5. The method of claim 1, wherein the determining whether to convert comprises considering at least one of a power penalty, a delay penalty or a reliability penalty in deciding whether to proceed with the converting of the current instruction.

6. A computer system comprising:
a memory;
at least one processor core, the at least one processor core being in communications with the memory; and
an instruction control interface, the instruction control interface performing a method comprising:
separately monitoring temperatures of multiple logic units within multiple processor cores of a plurality of processor cores of a computing device; and
automatically controlling assigning of one or more instructions by an instruction control interface for processing by the multiple processor cores based, at least in part, on the separately monitored temperatures of the multiple logic units within the multiple processor cores, the automatically controlling assigning comprising:
determining, in association with assigning a current instruction to one processor core of the multiple processor cores, that a needed logic unit of the one processor core for executing the current instruction has a temperature that exceeds a set temperature threshold;
based on the determining, ascertaining whether an other processor core of the multiple processor cores has the needed logic unit with a temperature that is below the temperature threshold;
based on ascertaining that the other processor core has the needed logic unit with a temperature below the temperature threshold, redirecting the current instruction to the other processor core for execution;

based on ascertaining that no other processor core of the multiple processor cores has the needed logic unit with a temperature below the temperature threshold, then determining whether to convert the current instruction to another instruction for execution by an other logic unit of the multiple logic units of the one processor core;

based on determining to convert the current instruction, automatically converting the current instruction to at least one converted instruction for execution via the other logic unit of the one processor core;

based on determining not to convert the current instruction, reordering execution of the current instruction by changing a sequence of execution of instructions on the one processor core;

based on reordering execution of the current instruction by changing the sequence of execution of the instructions on the one processor core, determining whether a temperature of the one processor core is still excessive; and based on the temperature of the one processor core still being excessive, throttling the one processor core.

7. The computer system of claim 6, wherein the automatically converting is performed, at least in part, by a just-in-time (JIT) compiler of the computing device, which converts the current instruction to the one or more converted instructions.

8. The computer system of claim 6, wherein the changing the sequence of execution of the instructions by the one processor core comprises selectively delaying execution of the current instruction by the one processor core based, at least in part, on an instruction type of the current instruction and the separately monitored temperatures of the multiple logic units within the one processor core.

9. The computer system of claim 6, wherein the automatically controlling assigning utilizes, at least in part, an anticipated temperature rise of at least one logic unit of the multiple logic units within the one processor core if the current instruction is executed by the one processor core, in combination with the separately monitored temperatures of the multiple logic units within the one processor core in determining whether to assign the current instruction for execution by the one processor core.

10. A computer program product for controlling assignment of instructions to one or more processor cores of a computing system, the computer program product comprising:
a computer-readable storage medium readable by a processor and storing instructions for execution by the processor for performing a method comprising:
separately monitoring temperatures of multiple logic units within multiple processor cores of a plurality of processor cores of a computing device; and
automatically controlling assigning of one or more instructions by an instruction control interface for processing by the multiple processor cores based, at least in part, on the separately monitored temperatures of the multiple logic units within the multiple processor cores, the automatically controlling assigning comprising:
determining, in association with assigning a current instruction to one processor core of the multiple processor cores, that a needed logic unit of the one processor core for executing the current instruction has a temperature that exceeds a set temperature threshold;

based on the determining, ascertaining whether an other processor core of the multiple processor cores has the needed logic unit with a temperature that is below the temperature threshold;

based on ascertaining that the other processor core has the needed logic unit with a temperature below the temperature threshold, redirecting the current instruction to the other processor core for execution;

based on ascertaining that no other processor core of the multiple processor cores has the needed logic unit with a temperature below the temperature threshold, then determining whether to convert the current instruction to another instruction for execution by an other logic unit of the multiple logic units of the one processor core;

based on determining to convert the current instruction, automatically converting the current instruction to at least one converted instruction for execution via the other logic unit of the one processor core;

based on determining not to convert the current instruction, reordering execution of the current instruction by changing a sequence of execution of instructions on the one processor core;

based on reordering execution of the current instruction by changing the sequence of execution of the instructions on the one processor core, determining whether a temperature of the one processor core is still excessive; and based on the temperature of the one processor core still being excessive, throttling the one processor core.

* * * * *